July 9, 1935. L. DÜRR ET AL 2,007,913
END CONNECTION FOR WIRES, CABLES AND THE LIKE
Filed May 6, 1933
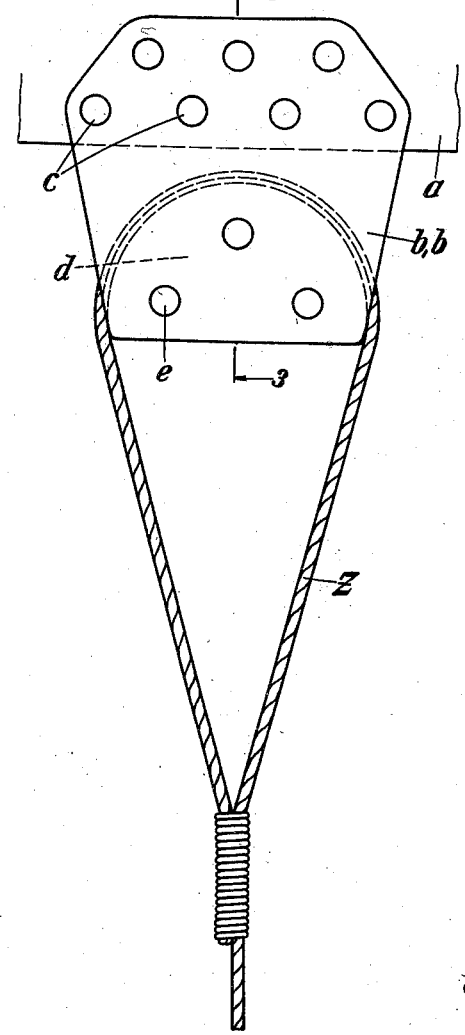
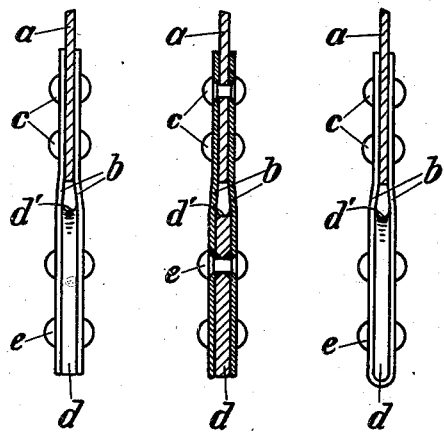
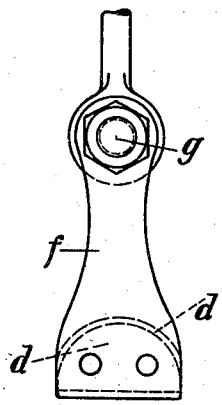
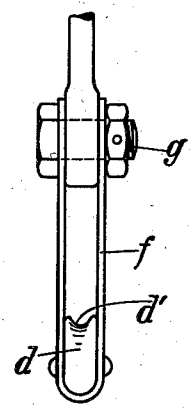
Inventors: Ludwig Dürr.
Wilhelm Hegmaus
By: [signature] Attorney Patented July 9, 1935

2,007,913

UNITED STATES PATENT OFFICE 2,007,913

END CONNECTION FOR WIRES, CABLES, AND THE LIKE

Ludwig Dürr, Friedrichshafen, and Wilhelm Stegmaier, Enzisweiler, Germany, assignors to Luftschiffbau Zeppelin Gesellschaft mit beschrankter Haftung, Friedrichshafen, Germany Application May 6, 1933, Serial No. 669,644 In Germany May 20, 1932

7 Claims. (Cl. 24—115)

Our invention relates to end connections for wires, cables and the like, especially in light constructions, such as airships, where such cables are fastened to girders or the like by means of gusset plates or similar elements.

Generally for such connections thimbles or eyelets are used which are stamped in the plate. Thus the radius for bending the wire or cable is very small. Consequently the eyelet and the thimble are under very unfavorable stresses.

According to our invention we avoid these disadvantages in the following way: We provide two sheet metal side members and insert a third member in between, which is rounded substantially in the shape of half a circle, the radius of which is so great that there will be no undue stress on the cable or wire when laid around this insert.

This will be understood best when having reference to the drawing which represents examples embodying our invention.

Fig. 1 is a front elevation of one modification, Fig. 2 is the corresponding side elevation, and Fig. 3 is a vertical cross section taken on line 3—3 of Fig. 1.

Fig. 4 represents the side elevation of a second modification.

Fig. 5 is a front elevation of a third modification, of which Fig. 6 is a side elevation.

The girder, gusset plate or the like to which the cable $z$ may be connected is indicated at $a$. There are two sheet metal members $b$ fastened to plate $a$ by means of rivets $c$ or by screws, bolts or the like. Between these members $b$ an insert $d$ is arranged, which is riveted thereto by means of rivets $e$. Instead of rivets, bolts or screws may also be made use of. At its upper circumference this insert is rounded substantially along the shape of a half-circle so that the parts of the rope or cable $z$ coming from below form a tangent thereto.

We prefer to provide a groove on the circumference of the insert as may be seen at $d'$, which is of advantage with regard to the wear of the cable $z$.

Furthermore, according to our invention, we cause the side members to be bent inwardly around the holes for the rivets, as shown in Fig. 3. Thereby part of the stress on the rivets is transmitted directly to the sheet metal side members.

It will be still better to make the two side members out of one piece of metal which is bent around the lower end of the insert, as represented in Figs. 4 and 6. In all events the insert $d$ can be made of a material which is not so strong as the material used for the members $b$, because the insert has to stand only compression stresses.

If it is desirable to have a hinge-like connection it is advisable to provide a bolt $g$ for fastening the member $f$, as shown in Figs. 5 and 6.

We do not want to be limited to the details disclosed or shown in the drawing as many variations will occur to those skilled in the art.

What we claim is:

1. End connection for wires, cables and the like comprising: two outer metal layers; a metal insert between said layers; said outer layers and said insert being provided with holes, the edges of said holes in said outer layers being bent inwardly; rivets fitting into said holes and connecting said outer layers with said insert; said insert having a substantially semi-circular rounded edge adapted for a wire or cable to be slung around without undue stress being caused in its bent portion.

2. End connection for wires, cables and the like as claimed in claim 4 further characterized in that said insert is made of material of lower strength than the material for said two outer metal plates.

3. A connection between a plate or sheet of material and a wire, cable or the like comprising a pair of sheet metal plates secured at a plurality of points on the sheet material, an insert secured at a plurality of points between the sheet metal plates and of greater thickness than the sheet material, said insert being formed with a curved, grooved edge adapted to receive a looped portion of the wire or cable.

4. A connection between a plate or sheet of material and a wire, cable or the like comprising a pair of sheet metal plates secured at a plurality of points to the sheet material, an insert secured at a plurality of points between the sheet metal plates, said insert being formed with a curved edge adapted to receive a looped portion of the wire or cable.

5. A device for securing a flexible strand to a body including means for holding an end of the strand in a looped and smoothly bent condition, a U-shaped saddle member of sheet metal surrounding and secured to the strand looping means with the legs of U-member extending to and being secured to the body.

6. A connection between a plate or sheet of material and a wire, cable or the like comprising a pair of sheet metal plates secured on alined, but opposite faces of the sheet material, an insert secured between the opposed sheet metal plates, said insert being formed with a curved, grooved edge adapted to receive a looped portion of the wire or cable.

7. In a connection between sheet material and a flexible strand, the combination of means for holding the strand in a looped position with plates for securing the strand looping means to the sheet material, said plates including depressed portions extending into cooperating recesses in the sheet material, and means for securing the sheet material and plates together and for holding the depressed portions in their cooperating recesses.

LUDWIG DÜRR.
WILHELM STEGMAIER.